(12) United States Patent
Robinson

(10) Patent No.: US 6,981,373 B2
(45) Date of Patent: Jan. 3, 2006

(54) BUOYANCY ENGINE

(76) Inventor: Mark Douglas Robinson, 2500 NE. 201st Ave., Unit 61, Fairview, OR (US) 97024-9725

( * ) Notice: Subject to any disclaimer, the term of this patent is extended or adjusted under 35 U.S.C. 154(b) by 76 days.

(21) Appl. No.: 10/845,186

(22) Filed: May 14, 2004

(65) Prior Publication Data

US 2005/0252207 A1 Nov. 17, 2005

(51) Int. Cl.
*F03C 1/00* (2006.01)
*F04B 17/00* (2006.01)

(52) U.S. Cl. .................. 60/496; 417/330; 417/331
(58) Field of Classification Search .............. 60/496; 417/330, 331, 333

See application file for complete search history.

(56) References Cited

U.S. PATENT DOCUMENTS

| | | | |
|---|---|---|---|
| 3,643,449 A | * | 2/1972 | Murphy .................. 405/186 |
| 4,208,877 A | | 6/1980 | Evans et al. |
| 4,208,878 A | * | 6/1980 | Rainey .................. 60/496 |
| 4,267,695 A | | 5/1981 | Micciche |
| 4,603,551 A | * | 8/1986 | Wood .................. 60/496 |
| 6,863,806 B2 | * | 3/2005 | Stark et al. .................. 210/170 |

OTHER PUBLICATIONS

Bruce Dunford, Subsurface buoys tap waves for clean, cheap power, Aug. 3, 2003, The Maui News, p. A3.

* cited by examiner

*Primary Examiner*—Charles G. Freay
(74) *Attorney, Agent, or Firm*—Stephen Christopher Swift; Swift Law Office

(57) ABSTRACT

A buoyancy engine, including an upper casing, a lower casing, and a manifold separating the upper and lower casings. The manifold has internal and external control means, that control amounts of liquid entering and leaving the manifold and casings through a primary route and an alternate route. There is a variably ballasted power piston within the upper casing, into and out of which liquid ballast can be pumped to change its buoyancy. There is a liquid discharge piston within the lower casing, that can be coupled to the variably ballasted power piston to form a primary pump. There is also a backup pump that can be used when the primary pump fails. A mechanical slide valve controls the entrance and exit of liquid from the manifold through the primary route.

20 Claims, 14 Drawing Sheets

BUOYANCY ENGINE

BACKGROUND OF THE INVENTION

1. Field of the Invention

The present invention relates to reciprocating engines, in which there is a buoyant object in a container, that can by its movement provide power to a crankshaft, or provide a hydraulic power output.

2. Description of the Prior Art

While there have been previous inventions of engines that use the buoyant properties of objects in fluids, none are equivalent to the present invention.

U.S. Pat. No. 4,208,877, issued on Jun. 24, 1980, to David V. Evans, John P. Davis and Thomas L. Shaw, discloses a device for extracting energy from sea waves by the motion of a submerged cylinder held by tie members at its ends. The instant invention is distinguishable, in that it does not required a submerged cylinder held by tie members.

U.S. Pat. No. 4,267,695, issued on May 19, 1981, to Peter Micciche, discloses a buoyancy engine having a single piston. The instant invention is distinguishable, in that it has two pistons.

Subsurface buoys tap waves for clean, cheap power are described in an article by Bruce Dunford, published on Aug. 3, 2003, in *The Maui News*, on page A3, which discloses a subsurface buoy that generates electricity as it moves up and down a rigid pole anchored to the bottom of the sea. The instant invention is distinguishable, as it does not require a buoy retained on a pole anchored to the sea floor.

None of the above inventions and patents, taken either singly or in combination, is seen to describe the instant invention as claimed.

SUMMARY OF THE INVENTION

The present invention is an engine that uses the buoyant properties of an object. The buoyancy of the object is externally controlled by fluid supplied to or withdrawn from the object. The object is a variably ballasted power piston ("VBPP") having a means for varying its internal ballast (and thereby its weight) to regulate the amount of buoyant force present in the system. The more the ballast, the less buoyant the VBPP is; the less the ballast, the more buoyant the VBPP becomes.

The engine includes upper and lower vertical hollow casings separated by a control block or manifold. The hollow casings can be rectangular, cylindrical, or any other suitable shape.

The upper casing determines the size and area of the lower casing. The environment in which the upper casing is located will determine the power output of the system. An upper casing with greater dimensions will enable the engine to supply more power; an upper casing with lesser dimensions will enable the engine to supply less power. The internal volume of the upper casing also determines the size of the VBPP to be built. At the bottom of the upper casing is an entrance for outside atmosphere or gas to enter to promote draining of liquid within the casing.

The horizontal cross-sectional area of the lower casing must be greater than or equal to that of the upper casing and the base of the manifold. The height of the lower casing is determined by the power stroke of the equipment and any excessive displacement in the upper casing after the VBPP is installed.

The manifold is used to provide a means to control the entering and exiting of liquid into and from the upper and lower casing, thereby operating the VBPP and the liquid discharge piston ("LDP"). The manifold has a primary and backup system for controlling the liquid. The primary system has a mechanical slide valve located internally for control, which is used in conjunction with the LPD. The backup system uses automatic valves, a mechanical pump, check valves, and hand-operated valves to keep the system going. The system is designed to be automated.

The VBPP is unique in that it can have its ballast changed while the system is in operation. The ballast is changed by either filling the different levels in the VBPP with gas and purging them of liquid to lighten the ballast, or by filling the levels with liquid and purging them of gas to increase the weight of the ballast. The change in ballast will change the amount of buoyant force involved in moving the VBPP up and down. The liquid used for ballast is kept in a clean tank that may or may not be pressurized. The gas for purging the liquid can be kept in a tank and stored for when it is needed. It can be any blend of gases that are suitable, and preferably help the environment. The VBPP and LDP have their dry weights compensated for by the use of counterweights and hydraulics, so that the full useful output from the VBPP can be achieved.

When the slide valve is opened on the supply side, liquid will enter the upper casing. The liquid will flow around the VBPP and encompass it. The VBPP will rise when enough liquid is purged from its interior levels. At some critical point the VBPP becomes buoyant, and with buoyancy, the piston can start its power stroke. When the VBPP moves on its power stroke, part of the energy is transferred to the LDP. The remaining energy is transferred to the output device. The amount of the output power is determined by the length of the stroke of the equipment using the energy. After maximum power is delivered, and before any overshooting of the piston can occur, the liquid supply from the slide valve is closed. (But if there is either overshooting or undershooting of the pistons, there are buffer springs that absorb the shock.) Then the slide valve is shifted to the drain position. At this point the supply to the VBPP is closed, and the drain is opened. The liquid supporting the VBPP will drain into the top of the LDP with the aid of the gas used to break the cohesion of the liquid. As the VBPP moves downward, liquid is routed to the top of the LDP, which is also descending, because the LDP and VBPP are mechanically coupled. The descending LDP fills with liquid and gas. Any trapped gas is vented back to the bottom of the VBPP in the upper casing. The vented gas will travel up the side of the VBPP, through liquid restraining material, and will vent into the atmosphere. The liquid will fill the LDP chamber as the VBPP settles to its bottom position. The VBPP is ready for another power stroke.

The liquid discharge piston works in conjunction with the variably ballasted power piston. The LDP uses part of the energy of the VBPP to purge liquid from the system, and works as a mechanical pump. The LDP has a pressure seal to keep liquid inside the top of the cylinder. Thus, on the power (upward) stroke, the liquid is purged back into the surrounding medium. Alternatively, the LDP can be set up so that liquid is purged on the downward stroke. In case the LDP is out of order, there is a backup system that can be employed. When the LDP fails, the liquid is routed with the aid of a computer through automated valves and delivered to a mechanical motor-driven pump, which purges the liquid back into the main tank (or the sea).

If the mechanical slide valve fails the VBPP and LDP can still be used, with the aid of a computer and automated valves for routing the liquid within the interior of the system.

The changeover from mechanical slide valve to automated valves can be done while the system is in operation to avoid losing the working load.

The support equipment includes: pumps to fill the gas holding tank with air or other gas; water pumps and controls used with the ballast system; hydraulic pumps with electrical control valves, used to operate the hydraulic cylinder that moves the slide valve; pneumatic valves used to control ballast liquid in the VBPP; and the computer which controls the multiple cylinders, and directs their power output to a crankshaft, or takes hydraulic output and channels it to a land-based hydraulic motor to make electricity remotely.

Some valves may be hand-operated, but all valves may be automated in a computerized system. The automated valves can be operated by pneumatic, hydraulic, vacuum, mechanical, electro-mechanical, or other suitable means, depending on the environment they are operating in. The control of the automated valves is done with small control valves or mechanical connections, which can operate by means including the following:

1. Mechanical valves may be employed with a crankshaft, camshaft, or a power-takeoff shaft.
2. Pneumatic, vacuum or hydraulic of valves with interlocking system control.
3. Electro-mechanical valves, which are preferable because they easily interface with computer peripherals, and allow on-line control.

Accordingly, it is a principal object of the invention to provide an improved buoyancy engine that is more efficient than the prior art.

It is another object of the invention to make possible the more efficient utilization and conservation of energy resources.

It is a further object of the invention to improve the environment by providing a non-polluting source of energy.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
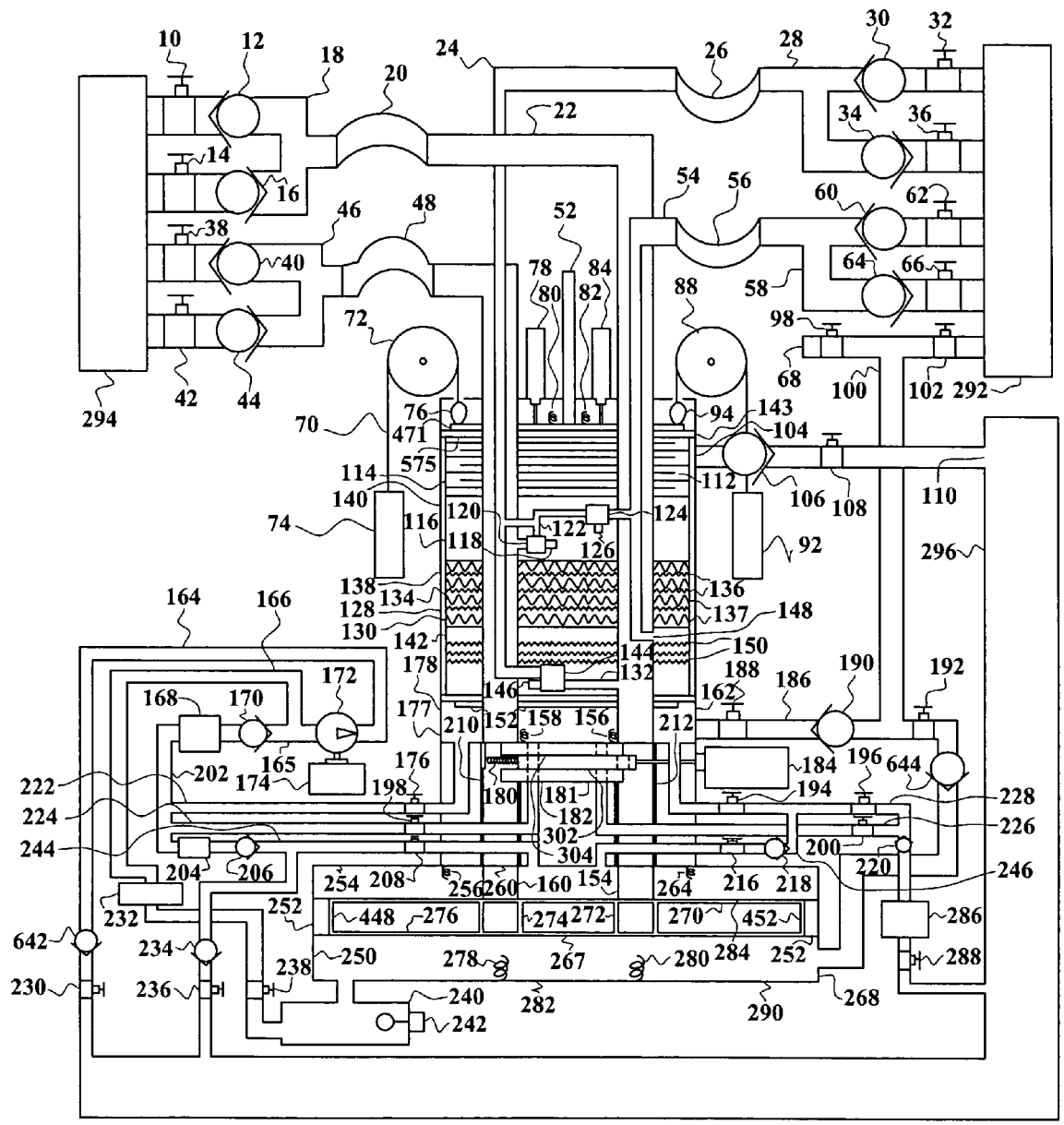
FIG. 1 is a front elevational view of the preferred embodiment of the invention.
Figure 2:
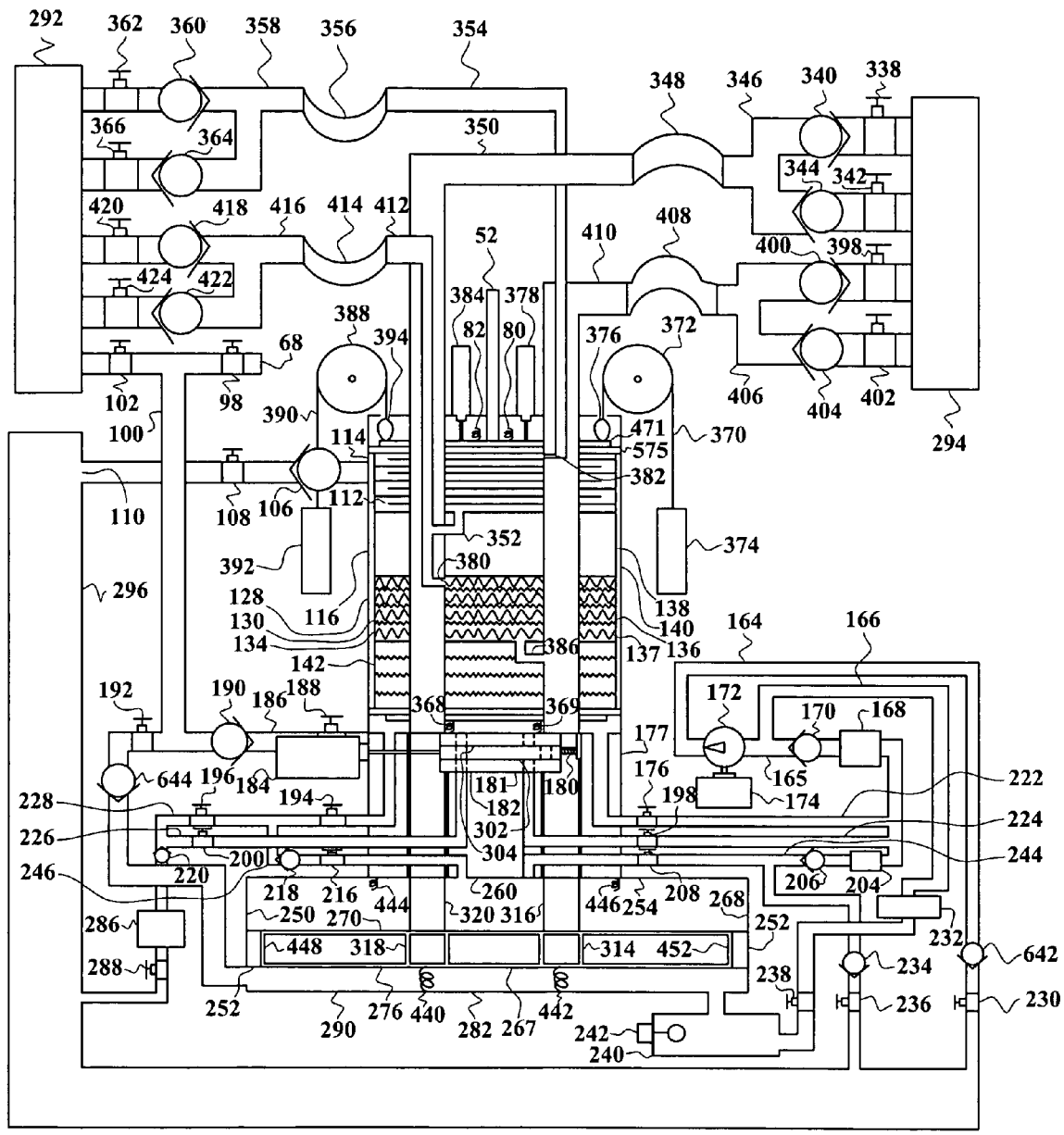
FIG. 2 is a rear elevational view of the preferred embodiment of the invention.

The present invention is a buoyancy engine. FIG. 1 is a front elevational view of the preferred embodiment of the invention, showing its three main sections, the upper outer casing 128, the main manifold 177, and the lower outer casing 268. (All the reference numbers given below are shown in FIG. 1 unless otherwise indicated.) FIG. 2 is a rear elevational view of the preferred embodiment of the invention.

The upper outer casing consists of side walls 128 and 138 (and 606 and 608 shown in FIG. 7) which attach to main manifold side walls 178 and 214 (and 638 and 640 shown in FIG. 4) which connect to the top wall 254 of the lower outer casing. The top wall of the lower outer casing is also connected to the side walls 250 and 268 (and 602 and 604 shown in FIG. 11) and the bottom wall 290 of the lower outer casing, so that the lower outer casing is able to contain liquid. (Note that the front side wall 608 of the upper outer casing, front side wall 640 of the main manifold, and front side wall 604 of the lower outer casing are removed in FIG. 1 to expose the underlying structure. Note also that the rear side wall 606 of the upper outer casing, rear side wall 638 of the main manifold, and rear side wall 602 of the lower outer casing are removed in FIG. 2 to expose the underlying structure.) The top wall 86 of the upper outer casing is used for containment of overflowing liquid, which is drained through opening 104 (when valve 108 is open) into tank 296 through opening 110. Check valve 106 is used to prevent any back flow of liquid.

Within the upper outer casing is located the variably ballasted power piston ("VBPP") 130. The VBPP has four separate levels 114, 116, 134 and 142, with a top wall 143, a bottom wall 152, right side wall 130, left side wall 140, rear side wall (606 shown in FIG. 7), and front side wall (608 shown in FIG. 7). (Note that the front side wall is removed in FIG. 1, and the rear side wall is removed in FIG. 2, to expose the underlying structure.) There is a constantly changing space 96 between the top of the VBPP and the top wall of the upper outer casing.

The first level 114 comprises interwoven piping 112 located within the level. The gas line (354 shown in FIG. 2) enters through a top opening (382 in FIG. 2) to connect to interwoven piping 112. The piping winds through the first level and connects (through connecting piece 352 in FIG. 2) to a liquid line (350 in FIG. 2). The interwoven piping is used provide fine control by using pipes to dampen liquid oscillation.

The second level 116 comprises an open chamber with two pneumatic valves 120 and 124. Valve 120 drains or fills liquid through opening 118 into line 50 when open. Valve 124 supplies or vents gas through opening 126. Gas line 122 connects line 24 to valve 120 and 124 for the purpose of control. The second level is normally either totally filled or totally empty (except when being drained or filled, of course).

The third level 134 comprises baffle plates 136 and damping material 137. The gas line (412 in FIG. 2) enters through the top of this level through an opening (380 in FIG. 2), then liquid filters through the damping material and baffle plates to be either drained or filled through an interconnecting line (386 in FIG. 2) to a stationary line (410 in FIG. 2). The damping material and baffle plates are used for moderate to intermediate control of liquid on this level.

The fourth level 142 comprises baffles plates 150 an a control pneumatic valve 144. The pneumatic valve is used to either fill or drain liquid through opening 146. Valve 144 is controlled by gas supplied through line 24. The state of the valve 144, as determined by the control gas, determines whether or not liquid is allowed to enter or exit through line 132 into stationary line 22. The conditions of lines 22 and 24 are determined by other external valves (as explained below). The baffle plates 150 are used for intermediate control of the liquid.

All four levels of the VBPP can be filled with liquid from tank 294, to regulate the amount of ballast, which controls the buoyant force that is exerted in the system. Liquid line 22 and 50 (and 350 and 410 in FIG. 2) provide a bidirectional flow of liquid, depending on whether valves in the system are open or closed. The liquid valves 14 and 42 (and 342 and 402 in FIG. 2) in conjunction with the check valves 16 and 44 (and 344 and 404 in FIG. 2) are used for filling. The liquid valves 10 and 38 (and 338 and 398 in FIG. 2) in conjunction with check valves 12 and 40 (and 340 and 400 in FIG. 2) are used for purging. As both are connected to common liquid manifolds 18 and 46 (and 346 and 406 in FIG. 2) only one valve at a time can be opened, either to fill or to purge. The pipes from the tanks are connected to the pipes on the VBPP by flexible tubing 20 and 48 (and 348 and 408 in FIG. 2).

The liquid part of the system works in conjunction with the gas part of the system. The gas part of the system has three subparts: the use of gas for control, the filling and purging of gas, and the use of gas to drain liquid.

The gas control subpart of the system is used in conjunction with the liquid and gas valves to control gas and liquid flow. Gas line 24 is a control line used to operate valves 120, 124 and 144 on the second and fourth levels of the variably ballasted power piston. Gas can be supplied by valve 32 through check valve 30 into gas manifold 28, or gas can be vented from the gas manifold 28 through check valve 34 when valve 36 is opened. The pressure or lack of pressure will be passed through flexible tubing 26 to gas line 24. When valve 32 is opened and pressure is applied, valves 120 and 124 close and valve 144 opens. After closing valve 32 and opening valve 36, gas is purged to gas valves 120 and 124 which open, and valve 144 closes. This will allow the filling or draining of liquid from the second and fourth levels of the VBPP.

The purging and filling of the gas is accomplished through gas line 54 (and 354 and 412 in FIG. 2) which provide a bidirectional flow of gas, depending on whether valves within the system are open or closed. Gas valves 62 (and 362 and 420 in FIG. 2) with check valves 60 (and 360 and 418 in FIG. 2) are used for filling. Gas valves 66 (and 366 and 424 in FIG. 2) with check valves 64 (and 364 and 422) are used for venting. As both lines are connected to common gas manifolds 58 (and 358 and 416 in FIG. 2), only one valve at a time can be open. The gas manifolds are connected by flexible tubing 56 (and 356 and 414 in FIG. 2) to the gas lines 54 (and 354 and 412 in FIG. 2) on the VBPP. By opening the proper valves in the right sequence, the liquid weight can be regulated in the VBPP, while the static weight is adjusted with hydraulics and counterweights.

Either air from the atmosphere entering through opening 68 when valve 98 is opened, or gas supplied by tank 292 which enters when valve 102 is opened, can be used to aid in draining the system. The air or gas is then routed through gas manifold 100 to valves 188 and 192. When gas valve 188 is opened, it will enter through opening 186 into the bottom of the outer upper casing 128, to aid in the draining of space 162 below the VBPP. Check valve 190 prevents back flow of liquid into the gas system. If gas valve 192 is opened, it will pass through check valve 644 and enter into space 282 below the Liquid Discharge Piston 267. The gas pressure will help drain any seeping liquid.

The hydraulics and counterweights are used to form a system to counteract the deadweight of the variable ballasted power piston, the support legs 154 and 160 (and 316 and 320 in FIG. 2) of which pass through the support leg casings 210 and 212 (and 310 and 312 in FIG. 2) to the Liquid Discharge Piston ("LDP") 267. Packing (not shown in the drawings) is placed between the support legs and the casings to create a liquid seal. The counterweight part of the system consists of the following: pulleys 72 and 88 (and 372 and 388 in FIG. 2), fasteners 76 and 94 (and 376 and 394 in FIG. 2) to the VBPP, cables 70 and 90 (and 370 and 390 in FIG. 2), and counterweights 74 and 92 (and 374 and 392 in FIG. 2). The hydraulic part of the system uses hydraulic cylinders 78 and 84 (and 378 and 384 in FIG. 2), which are dual acting. These four cylinders can also be used for hydraulic power output. If mechanical power output is required, then shaft 52 can be used.

In case the hydraulics or the counterweights fail, and the VBPP and the LDP overshoot or undershoot their working settings, there are buffer springs used to dampen the shock to the system. Buffer springs 156, 158, 278 and 280 (and 306 and 308 in FIG. 5, and 368, 396, 440 and 442 in FIG. 2) are used when the pistons undershoot or bottom out. If the pistons overshoot the working setting, then buffer springs 80, 82, 256 and 264 (and 298 and 300 in FIGS. 4, 426, 428, 430 and 432 in FIG. 7, and 444 and 446 in FIG. 2) retard the upward momentum of the system.

Figure 3:
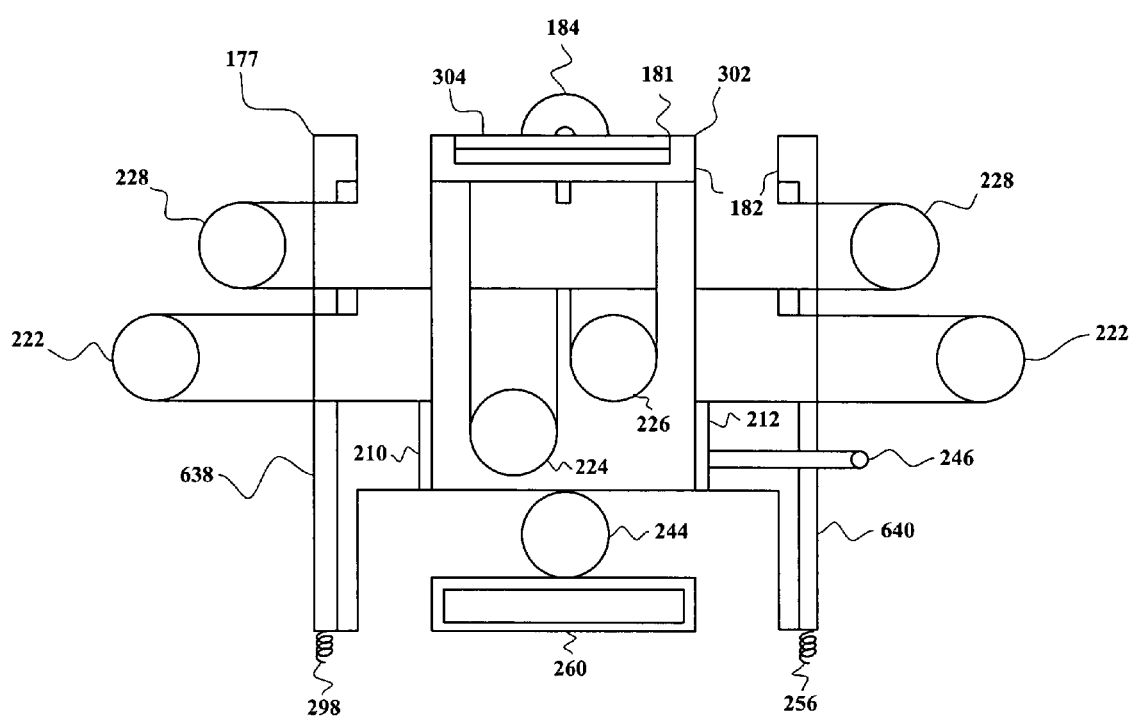
FIG. 3 is a left side detail view of the main manifold in the preferred embodiment of the invention.
Figure 4:
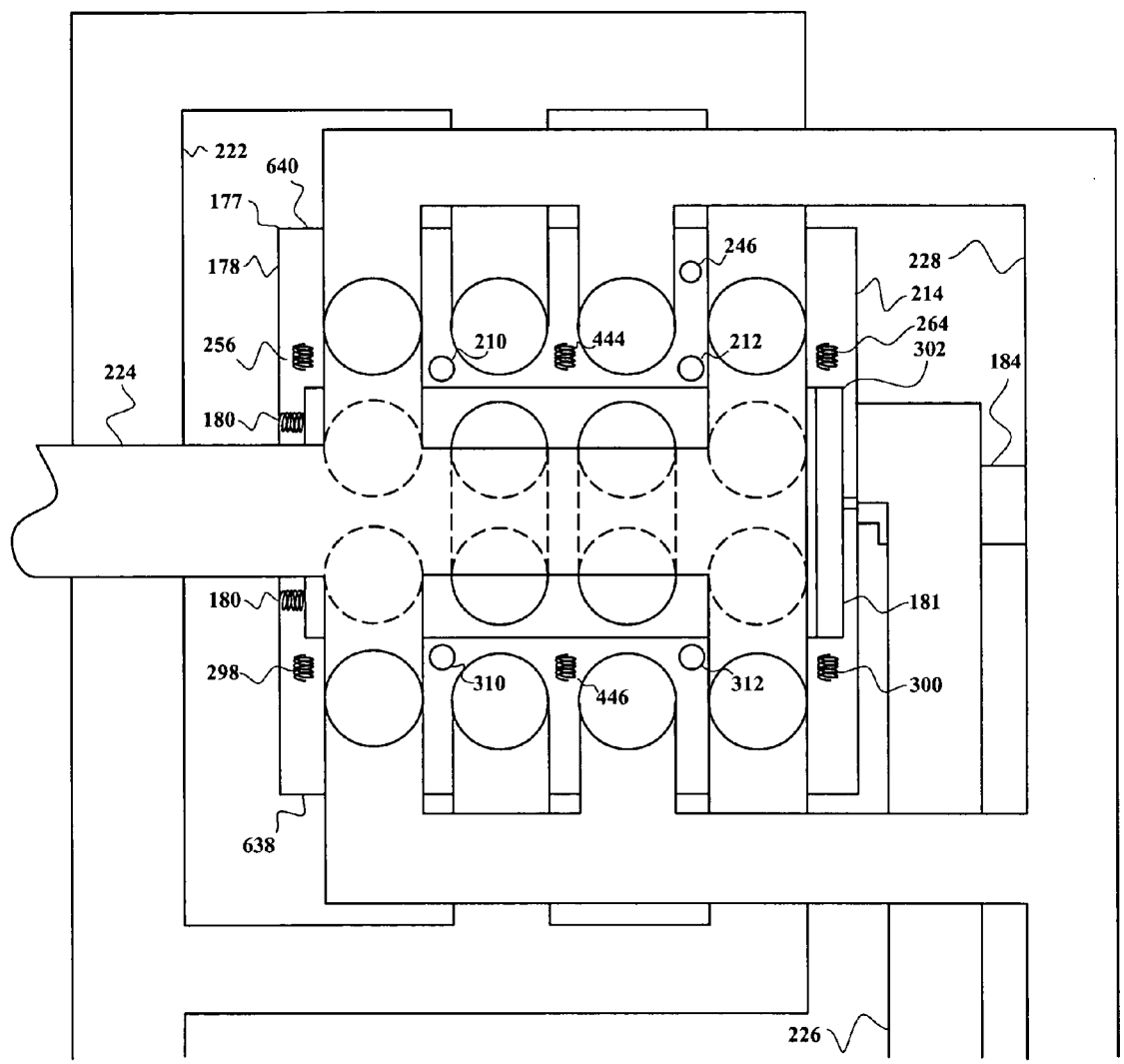
FIG. 4 is a bottom detail view of the main manifold in the preferred embodiment of the invention.
Figure 5:
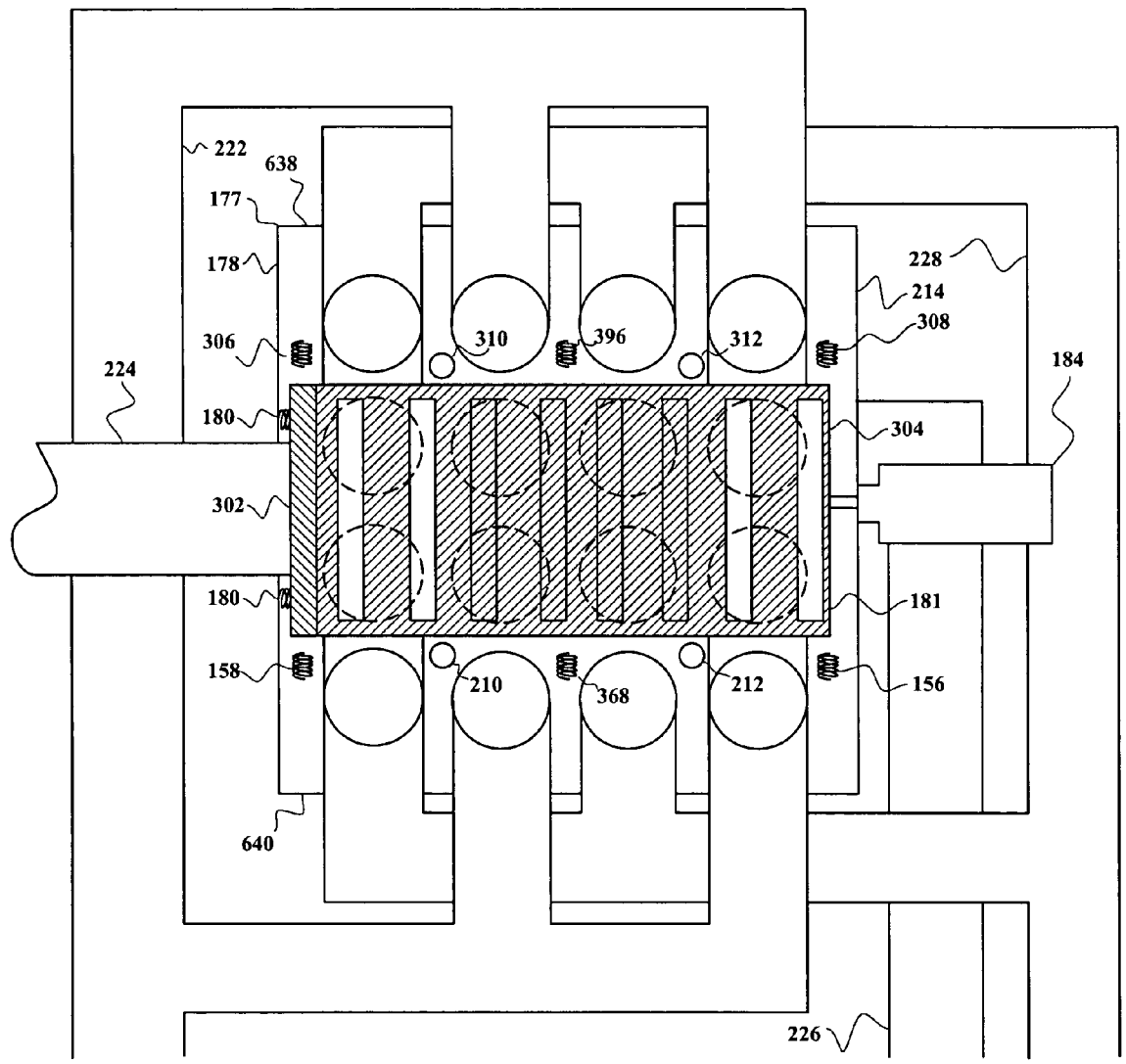
FIG. 5 is a top detail view of the main manifold with the drain closed and the supply opened on the mechanical slide valve in the preferred embodiment of the invention.
Figure 6:
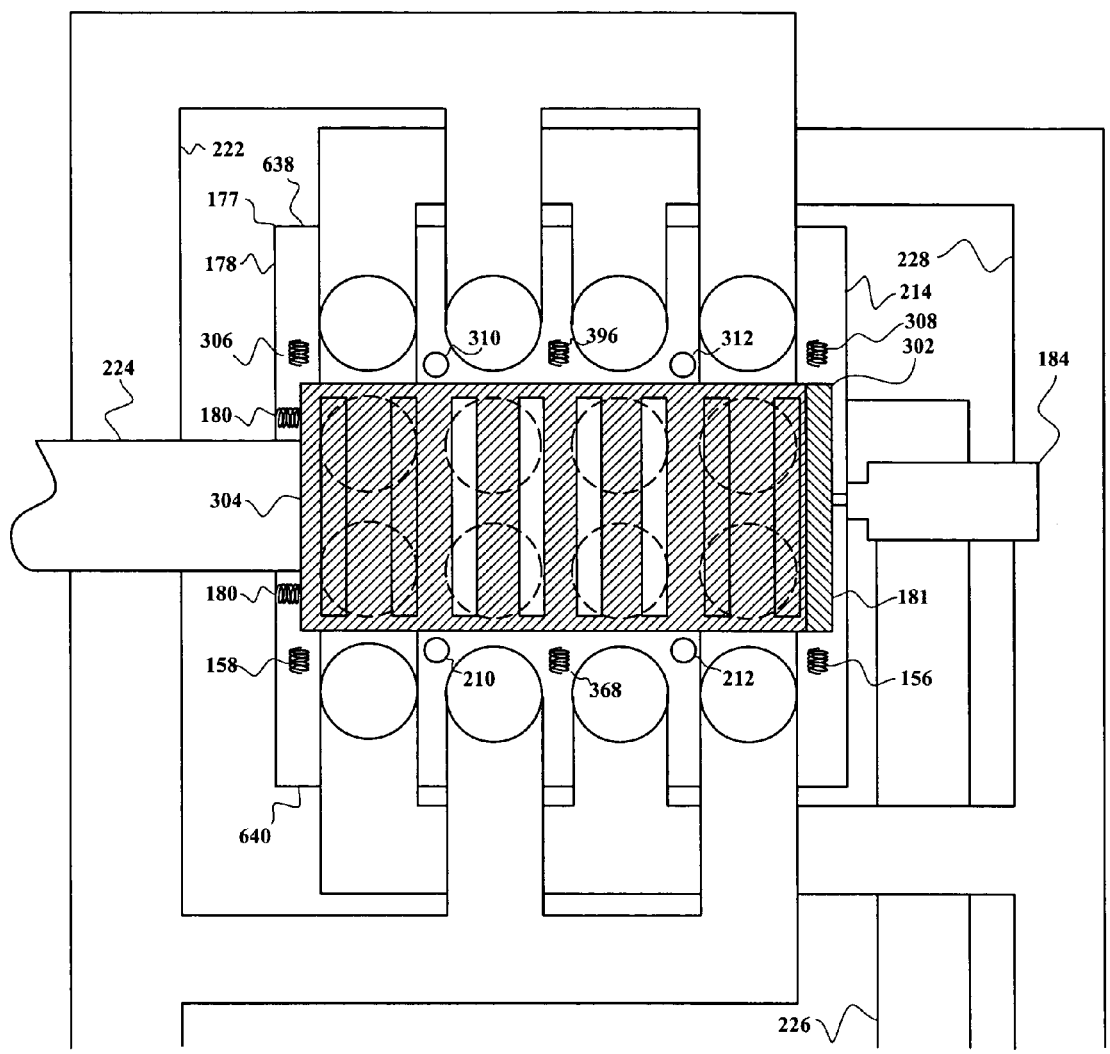
FIG. 6 is a top detail view of the main manifold with the drain open and the supply closed on the mechanical slide valve in the preferred embodiment of the invention.

The variably ballasted power piston is mechanically connected to the liquid discharge piston, and as noted above, its support legs pass through support leg casings in the main manifold. FIG. 3 is a left side detail view of the main manifold. FIG. 4 is a bottom detail view of the main manifold. The main manifold 177 comprises an outside casing 178 and 214 (and 638 and 640 in FIG. 4), a top (182 in FIG. 5) and a bottom (260 in FIG. 4). Inside the main manifold there is internal piping (222, 224, 226, 228, 244 and 246 in FIG. 3), a mechanical slide valve 181, with stationary bottom 182, movable center 302, and stationary top, and a closing spring (180 in FIG. 4) with a power actuator (184 in FIG. 4). The purpose of the mechanical slide valve is to provide primary control of the filling and draining of the liquid in space 162. FIG. 5 is a top detail view of the main manifold with the drain closed and the supply opened on the mechanical slide valve. FIG. 6 is a top detail view of the main manifold with the drain open and the supply closed on the mechanical slide valve. Outside air from opening 68 and valve 98 or gas from tank 292 through valve 102 travels down through gas manifold 100 to aid in the drawing of liquid from space 162 below the VBPP when valve 188 is opened. The internal piping 222 and 228 is used to provide backup control of the liquid (filling or draining) in the event that the slide valve is incapacitated. Valves 176 and 194 are used to isolate the backup system from the mechanical slide valve system. The mechanical slide valve system also has valves 198 and 200 to isolate it from the backup system. The change over may be done with a computer-based system.

The preferred embodiment of the invention includes a liquid discharge system, which includes a primary mechanical pump formed by the VBPP and LDP, and a backup rotary pump that is used if the primary pump fails. The liquid discharge piston 267 includes a top 270, a bottom 276, a left side vertical casing 448, a right side vertical casing 452, a back side vertical casing (450 in FIG. 7) and a front side vertical casing (454 in FIG. 7), with a pressure seal including lower steel plates (326, 328, 330 and 332 in FIG. 7), upper steel plates (334, 336, 434 and 436 in FIG. 7), and sealing material 252 that prevents liquid from space 284 from entering space 282. (Note that the front of the sealing material is removed in FIG. 1, and the rear of the sealing material is removed in FIG. 2, to expose the underlying structure.) Liquid from space 162 is either drained through line 222, with valve 176 open, into liquid manifold 202, or else it is drained through line 224 (when the mechanical slide valve is open), with valve 198 open, into liquid manifold 202. From the liquid manifold 202, the liquid can either go through automatic valve 168 when open, or else it can go through automatic valve 204 when open. When automatic valve 204 is open, the liquid drains through check valve 206, passes through valve 208 (if open) into line 244 and fills space 284 with liquid. No liquid will pass through check valve 234 due to high pressure in tank 296, as compared to the low pressure in liquid manifold 202. As space 284 fills with liquid, any trapped gas is vented through line 246, valve 216 (if open), check valve 218, and into the backup supply line 228 between valves 194 and 196. If valve 194 is open, gas will enter space 162. Liquid is prevented from entering space 284 from space 162 by check valve 218.

Now the system is filled and ready for the power stroke of the variably ballasted power piston. As the power stroke is initiated, the liquid in space 284 is compressed and pressure increases. As the pressure increases past the pressure in tank 296, liquid is forced up line 244, through valve 208, and is blocked by check valve 206. The liquid is then diverted down to check valve 234, which opens due to the higher pressure of the liquid. The higher pressure liquid is then passed through valve 236 (if open) back into tank 296.

Any liquid that gets past pressure seal 252 and drains into area 282 will be drained into bilge tank 240 with some help. Gas or air from the atmosphere can be supplied by gas manifold 100 through valve 192 and check valve 644 through the side of casing 268 to aid in draining of any excess liquid. The bilge tank 240 has a liquid level sensor with controls 242. The sensor will indicate when the tank is full and needs to be pumped out. With bilge tank isolation valve 238 open, automatic valve 232 can be opened while pump 172 is operating. The operation of pump 172 allows liquid to be pumped down line 164 through check valve 642 and open valve 230 into tank 296. Check valve 642 prevents any tank liquid from entering the discharge line.

The rotary pump 172 is driven by motor 174, and it is used to drain liquid from space 162 if the primary pump should fail. If the primary pump should fail, then automatic valve 204 is closed and automatic valve 168 is opened. Liquid from line 222 and/or line 224 is directed into manifold 202 through valve 168, check valve 170, and line 165 into rotary pump 172. When the rotary pump is operating, liquid is pumped down discharge line 164 through check valve 642 and valve 230 into tank 296 (or alternatively, into the sea). The rotary pump can be used to extract liquid from bilge tank 240 or space 162, depending on which valves are open and closed. The rotary pump draws water from the bilge tank through suction line 166 if valve 238 and automatic valve 232 are open.

The liquid supply system is used in conjunction with the discharge system. The liquid is supplied from tank 296 (or the sea) through isolation valve 288, automatic valve 286, check valve 220, and isolation valve 200 to the bottom of the mechanical slide valve. Isolation valve 196 should be closed except when the backup liquid system is needed. When the mechanical slide valve is operating using hydraulic cylinder 184, the slide valve will regulate the amount of liquid entering space 162. In the event of a malfunction of the mechanical slide valve, valves 198 and 200 are closed, which isolates the mechanical slide valve. Then the backup supply and automatic drain lines can be used by opening valves 196 and 176, after automatic valve 286 is closed. Automatic valve 286 is used to regulate liquid, by alternatively opening and closing the flow of liquid to or from space 162. This allows the system to continue to operate without the use of the mechanical slide valve.

Figure 7:
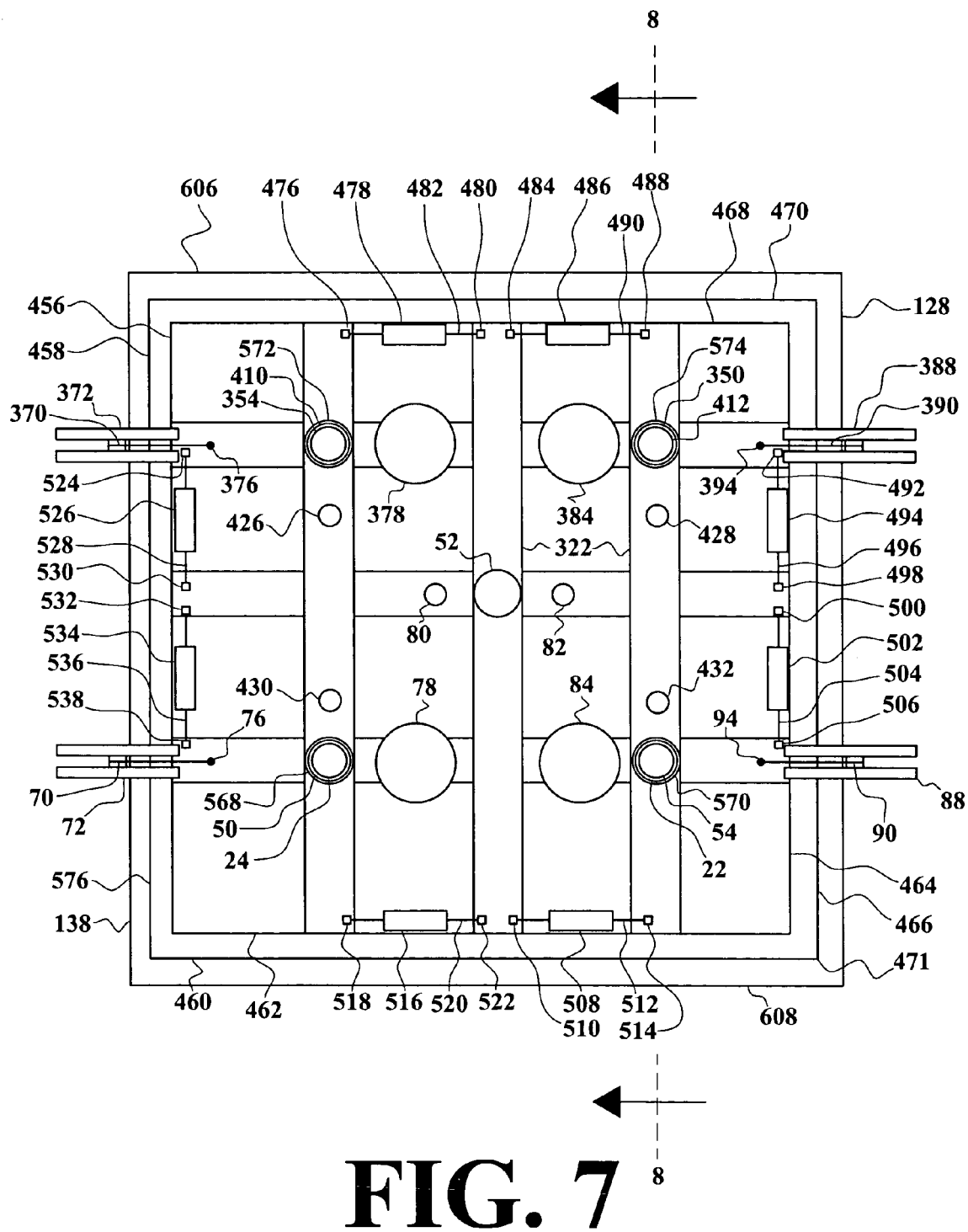
FIG. 7 is a top detail view of the upper spacer in the preferred embodiment of the invention.
Figure 8:
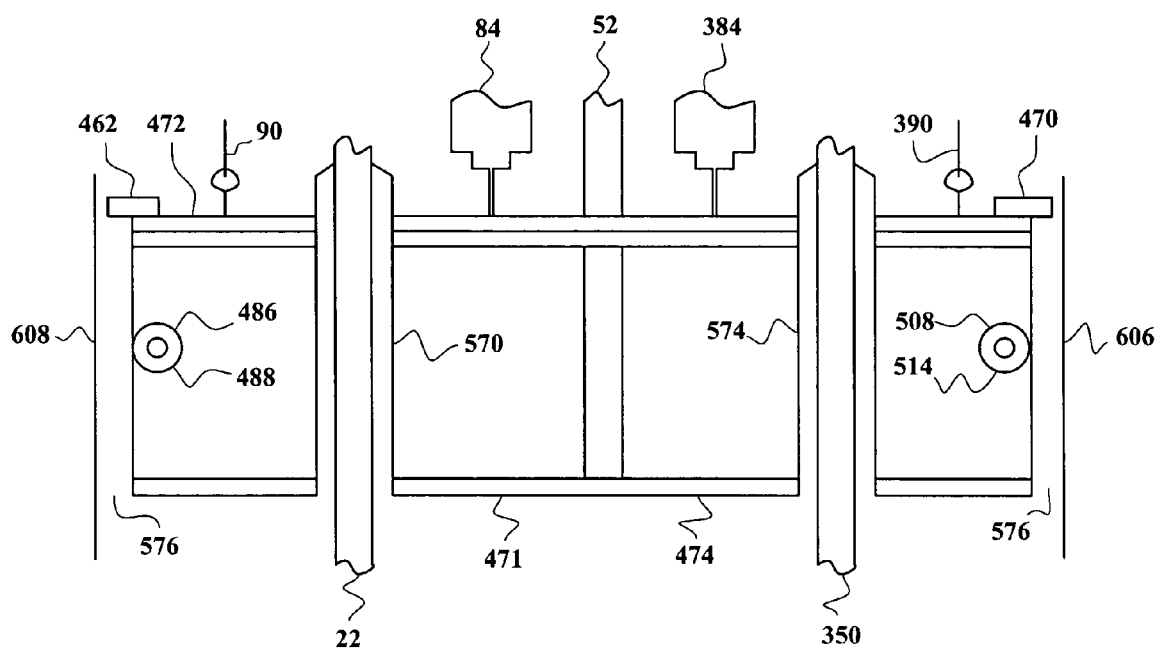
FIG. 8 is a vertical sectional detail view drawn along lines 8—8 of FIG. 7 of the upper spacer in the preferred embodiment of the invention.

FIG. 7 is a top detail view of the upper spacer of the preferred embodiment of the invention. (All the reference numbers given in this paragraph are shown in FIG. 7 unless otherwise indicated.) FIG. 8 is a vertical cross-sectional detail view drawn along lines 8—8 of FIG. 7 of the same upper spacer. The upper spacer 471 is a platform of reinforced steel to channel the mechanical power output of the VBPP into useful work. It includes an extra-heavy top steel plate (472 in FIG. 8) with left side 456, front side 460, right side 464, back side 468, and bottom plate (474 in FIG. 8). Attached to the top steel plate are four small steel plates 458, 462, 466 and 470 which are used to keep the liquid restriction material in place. Inside of the spacer are structural steel beams 322 and slip couplings 568, 570, 572 and 574. The slip couplings provide a means for the liquid carrying pipes (22 and 24 in FIGS. 1 and 350 and 410 in FIG. 2) to exit the top of the VBPP. The slip couplings may be welded to the pipes to provide structural support. The pipes provide part of the intricate structural support of the VBPP. The extra-heavy top steel plate allows the fastening of the hydraulic cylinders 78, 84, 378 and 384 and/or the power output shaft 52 (if used). The steel beams and the steel plate provide attachment points 76, 94, 376 and 394 for the steel cables 70, 90, 370 and 390 used for the counterweights. The pulleys 72, 88, 372 and 388 are set up on all four corners of the VBPP to provide dry weight compensation. The rollers 478, 486, 494, 502, 508, 516, 526 and 534 are attached to the side walls of the upper spacer, and are used to maintain the open space between the outer casing and the VBPP. The open space is used for liquid restriction material 576 to restrict the downward flow of the liquid during the liquid draining cycle. The rollers turn on shafts 482, 490, 496, 504, 512, 520, 528 and 536. On each opposite end of each shaft is a bearing and assembly 476, 480, 484, 488, 492, 498, 500, 506, 510, 514, 518, 522, 524, 530, 532 and 538. Buffer springs 80, 82, 426, 428, 430 and 432 absorb shock if the VBPP exceeds its operating perimeters. All unused space will be filled with material to keep liquid out.

Figure 9:
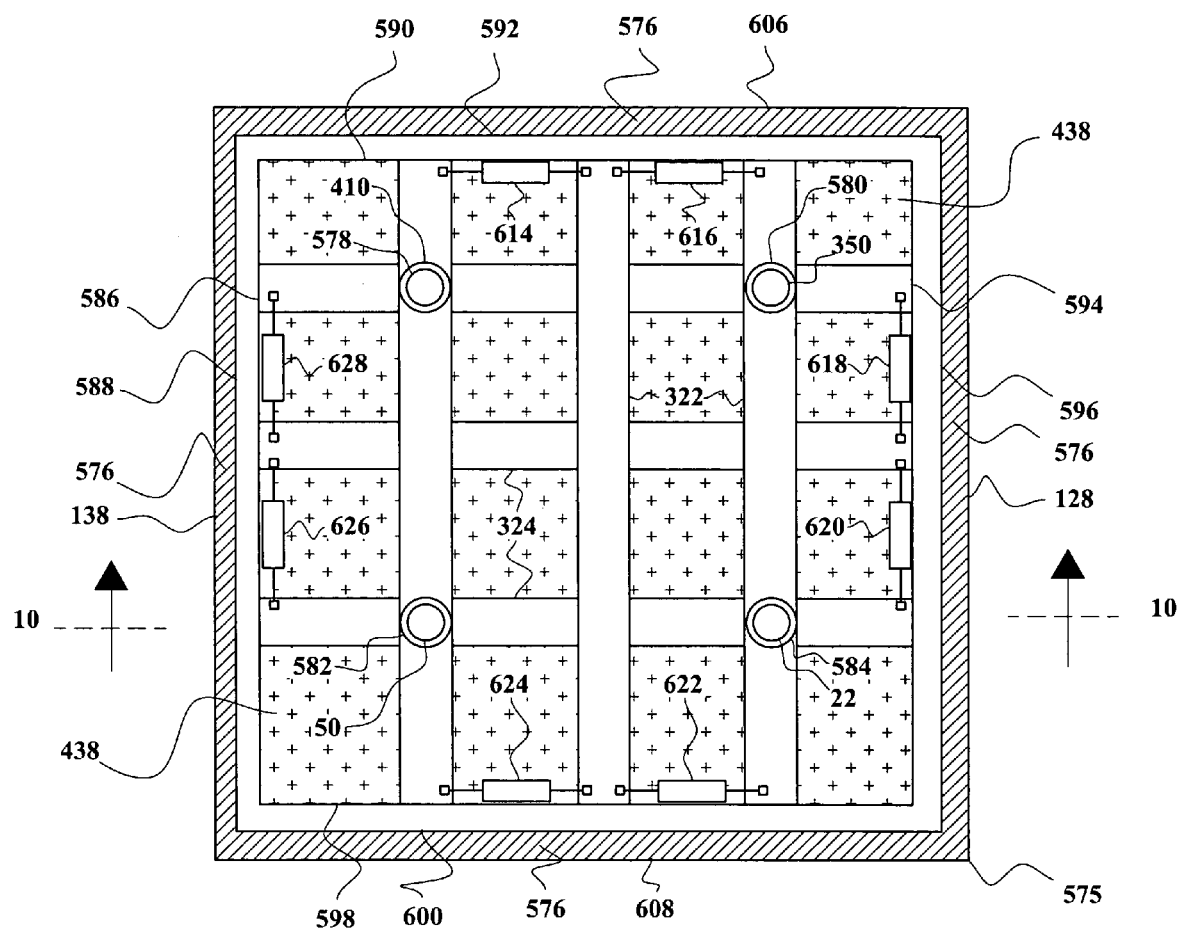
FIG. 9 is a top detail view of the lower spacer in the preferred embodiment of the invention.
Figure 10:
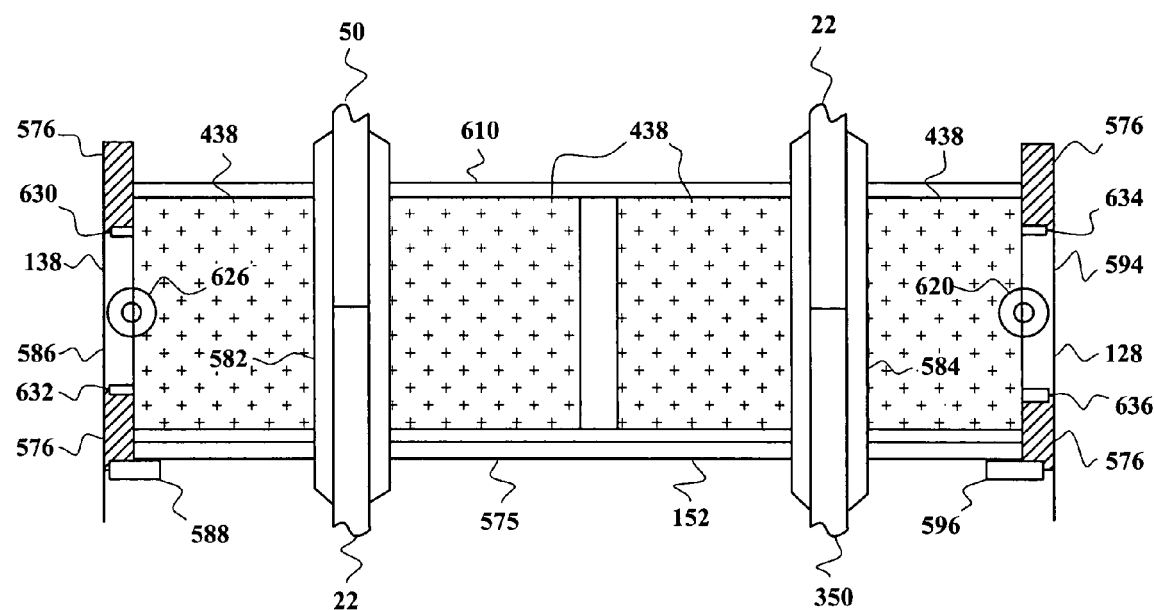
FIG. 10 is a vertical sectional detail view drawn along lines 10—10 of FIG. 9 of the lower spacer in the preferred embodiment of the invention.

FIG. 9 is a top detail view of the lower spacer of the preferred embodiment of the invention. (All the reference numbers given in this paragraph are shown in FIG. 9 unless otherwise indicated.) FIG. 10 is a vertical cross-sectional detail view drawn along lines 10—10 of FIG. 9 of the same lower spacer. The lower spacer 575 is a platform of reinforced steel used in part for structural integrity. It has a steel top (610 in FIG. 10), left side 586, back side 590, right side 594, front side 598, and a heavy duty steel bottom plate (152 in FIG. 10). The bottom plate has smaller vertical steel plates attached to it, namely, left plate 588, back plate 592, right plate 596 and front plate 600, which help support and prevent shifting of the liquid restriction material 576 when the VBPP is moving. Inside of the lower spacer are steel beams 322 and 324 which are welded to slip couplings 578, 580, 582 and 584. When welded completely together, the slip couplings provide a transition from liquid carrying pipes 22, 50, 350 and 410 to support legs (154 and 160 in FIGS. 10 and 316 and 320 in FIG. 2). To make the transition, the liquid carrying pipes are inserted halfway into the slip couplings, and the support legs are also inserted halfway into opposite ends of the slip couplings. As the support legs are solid and the liquid carrying pipes are hollow, when they are welded together with the slip couplings, no liquid can escape. Located around the perimeter of the lower spacer are rollers 614, 616, 618, 620, 622, 624, 626, 628, which have the same construction as the rollers on the upper spacer. Bumpers (630, 632, 634 and 636 in FIG. 10) keep the liquid restriction material (or gasket) 576 away from the rollers. All unused space within the spacer is filled with material 438 to keep liquid out. The spacers fit within the upper outer casing with right side section 128, left side section 138, back side section 606, and front side section 608. Although there are two spacers in the preferred embodiment, depending on the height of the upper outer casing there may be only one spacer or more than two spacers.

Figure 11:
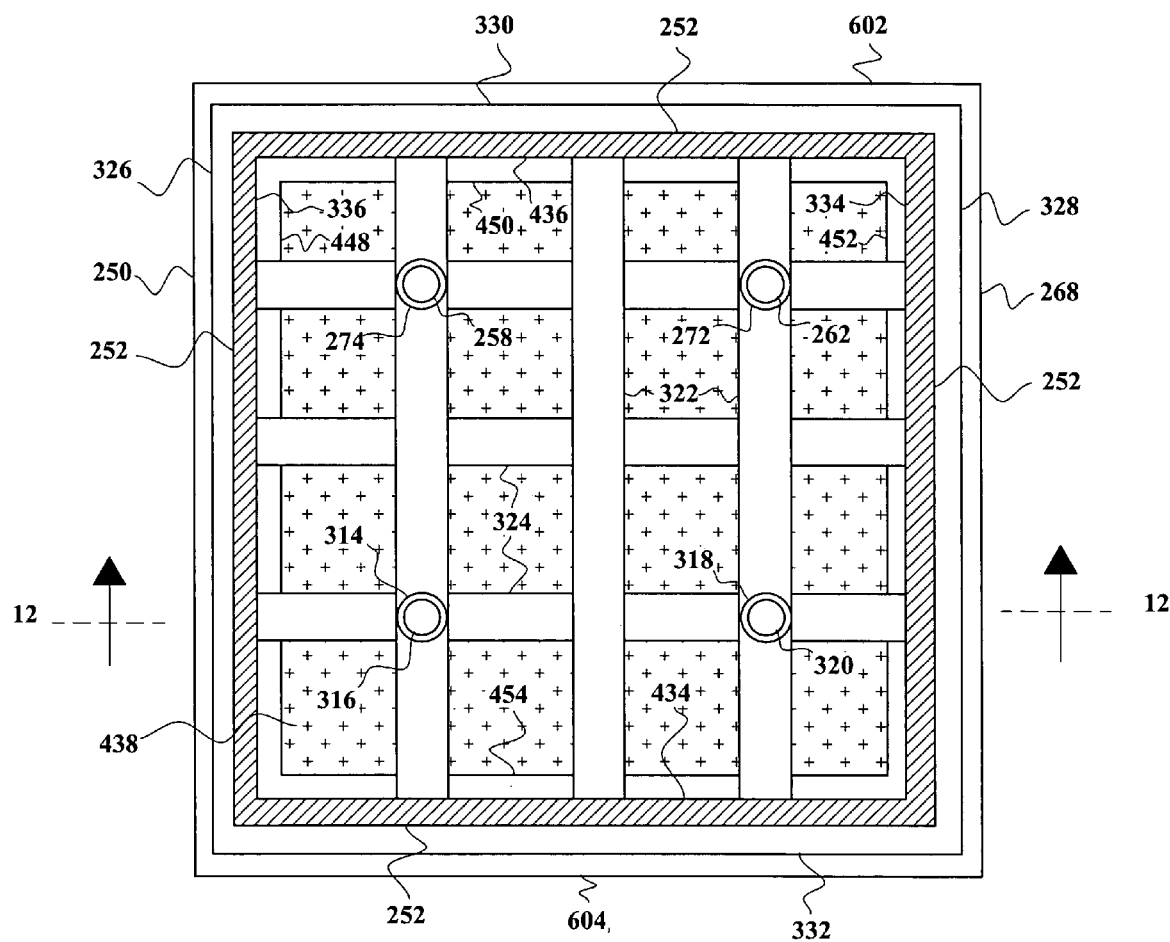
FIG. 11 is a top detail view of the liquid discharge piston in the preferred embodiment of the invention.
Figure 12:
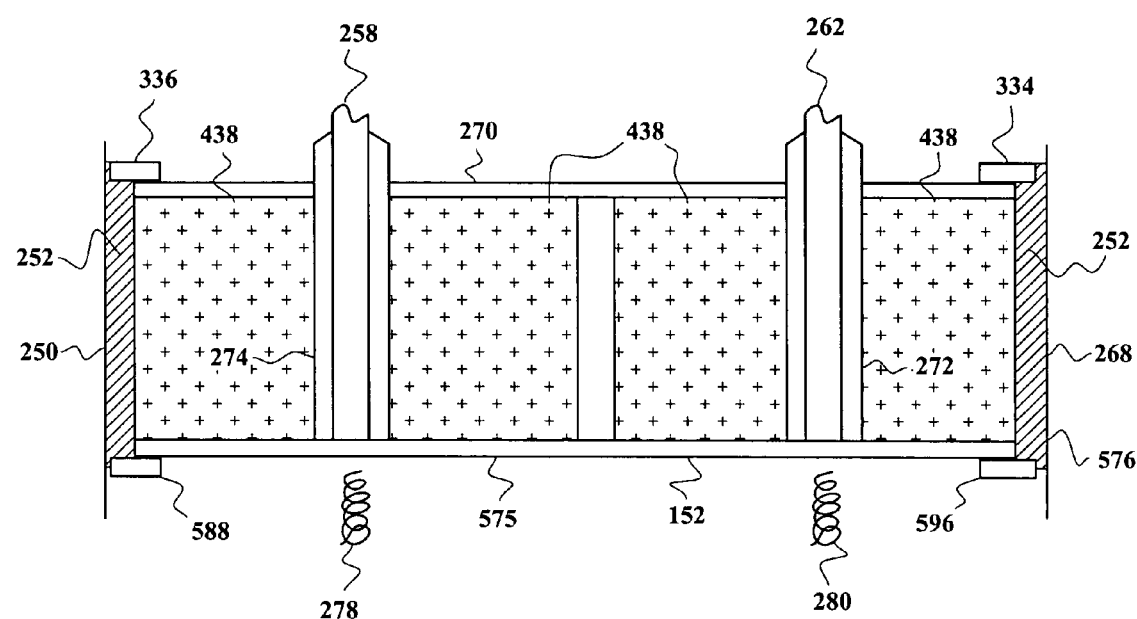
FIG. 12 is a vertical sectional detail view drawn along lines 12—12 of FIG. 11 of the liquid discharge piston in the preferred embodiment of the invention.

FIG. 11 is a top detail view of the liquid discharge piston of the preferred embodiment of the invention. (All the reference numbers given in this paragraph are shown in FIG. 11 unless otherwise indicated.) FIG. 12 is a vertical cross-sectional detail view drawn along lines 12—12 of FIG. 11 of the LDP. The LDP is essentially contained by the lower outer casing. The horizontal cross-section of the LDP and the lower casing is a square that is larger in area than that of the main manifold and upper casing. The LDP includes steel beams 322 and 324 welded to slip couplings 272, 274, 314 and 318 for the purpose of connecting support legs 258, 262, 316 and 320 from the VBPP to the LDP. The LDP has a steel top (270 in FIG. 12), bottom (276 in FIG. 12), left side 448, back side 450, right side 452, and front side 454. The bottom has small steel plates (326 and 328 in FIG. 12, and two others not shown in the drawings) attached to it, while the top also has small steel plates 334, 336, 434 and 436 attached to it. The small steel plates on the top and bottom combine with a liquid proof sealant 252 to form a liquid tight barrier (or gasket). The liquid tight barrier prevents liquid from migrating into the bottom space below the LDP (282 in FIG. 1) from the top space (284 in FIG. 1) above the LDP. Any liquid that seeps through the barrier will drain into the bilge tank (240 in FIG. 1). Drainage will be aided by gas that will be present when a valve (192 in FIG. 1) is opened. Backing up of liquid into the gas system is prevented by a check valve (644 in FIG. 1).

Figure 13:
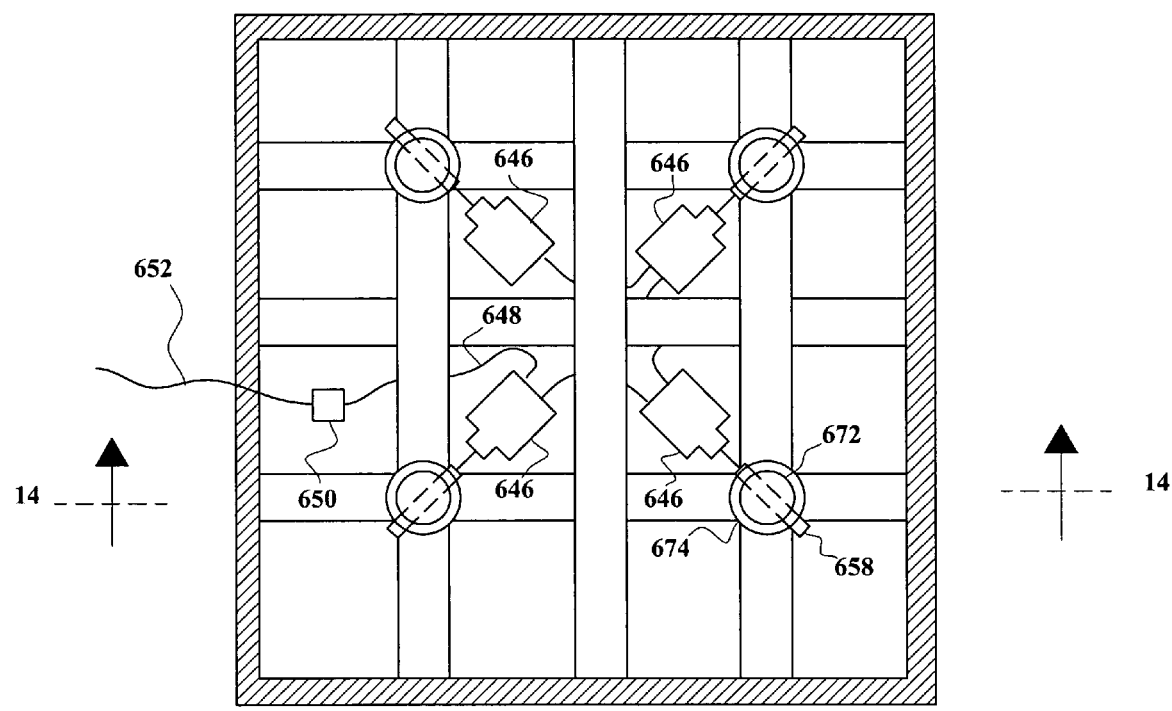
FIG. 13 is a top detail view of an optional quick disconnecting means for the liquid discharge piston and/or the lower spacer.
Figure 14:
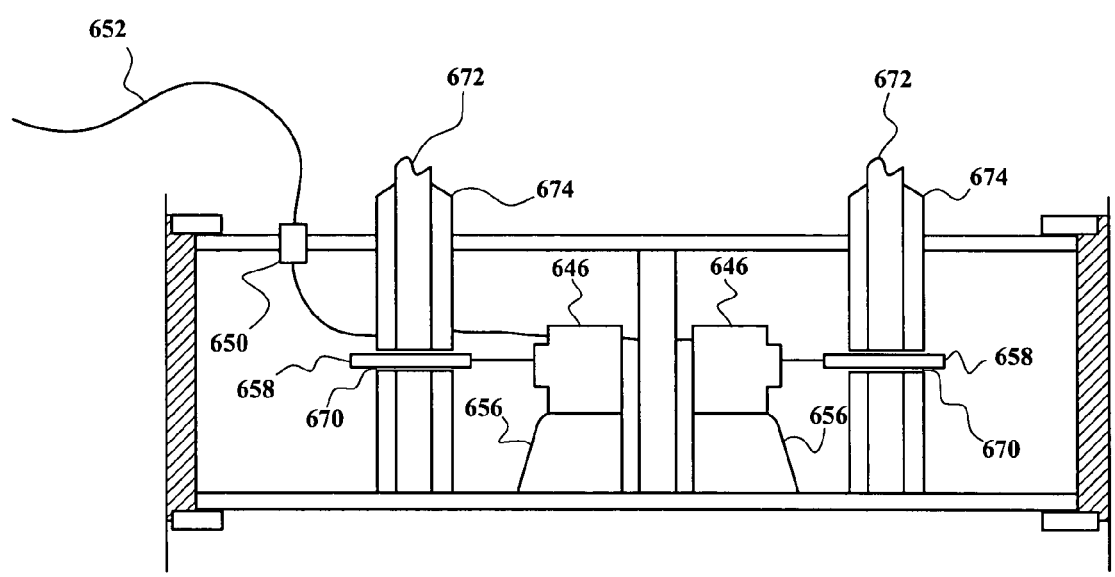
FIG. 14 is a vertical sectional detail view drawn along lines 14—14 of FIG. 13 of the optional quick disconnecting means for the liquid discharge piston and/or the lower spacer.

FIG. 13 is a top detail view of an optional quick disconnecting means for the LDP and/or the lower spacer. (All the reference numbers given in this paragraph are shown in FIG. 13 unless otherwise indicated.) FIG. 14 is a vertical cross-sectional detail view drawn along lines 14—14 of FIG. 13 of the same quick disconnecting means. Four hydraulic cylinders 646 are connected by hydraulic line 648. The hydraulic line then passes to a connector 650 which is connected to an external flexible line 652 which will continue on to connect to an external hydraulic system (not shown in the drawings). The mounting bases 656 are used to protect the hydraulic cylinders. The pins 658 are inserted though holes 670 that penetrate both the support legs 672 and the slip couplings 674.

Note that all valves not described as being automated may be either hand-operated or automated. It is preferable that all valves be automated on a computerized system.

It is to be understood that the present invention is not limited to the sole embodiment described above, but encompasses any and all embodiments within the scope of the following claims.

I claim:

1. A buoyancy engine, comprising:
   an upper casing;
   a lower casing;
   a manifold separating the upper and lower casings, with a bottom of the upper casing fitting over a top of the manifold, and a top of the lower casing fitting over a bottom of the manifold;
   the manifold having control means, that control amounts of liquid entering and leaving the manifold and casings;
   a variably ballasted power piston within the upper casing, into and out of which liquid ballast can be pumped to change its buoyancy; and
   a liquid discharge piston within the lower casing, that can be coupled to the variably ballasted power piston to form a primary pump.

2. The buoyancy engine according to claim 1, wherein the control means of the manifold includes an internal control means and an external controls means.

3. The buoyancy engine according to claim 2, wherein the control means of the manifold controls amounts of liquid entering and leaving the manifold and casings through a primary route and an alternate route.

4. The buoyancy engine according to claim 3, including a backup pump that can be used when the primary pump fails.

5. The buoyancy engine according to claim 4, including a mechanical slide valve that controls entrance and exit of liquid from the manifold through the primary route.

6. The buoyancy engine according to claim 5, including automatic valves, a mechanical pump, check valves and hand-operated valves that control the entrance and exit of liquid from the manifold through the backup route.

7. The buoyancy engine according to claim 6, including flexible supply lines that can carry liquid and gas from stationary supply points to the variable ballasted power piston.

8. The buoyancy engine according to claim 7, including counter weights and hydraulic power means that compensate for the dry weight of the variable ballasted power piston.

9. The buoyancy engine according to claim 8, including computer controlled valves and automated support equipment.

10. The buoyancy engine according to claim 9, including an entrance for gas in the bottom of the lower casing.

11. The buoyancy engine according to claim 10, including a tank for liquid used as ballast.

12. The buoyancy engine according to claim 11, including a tank for gas used for purging the liquid used as ballast.

13. The buoyancy engine according to claim 12, including spacers having means for maintaining clearance between the variable ballasted power piston and the upper casing.

14. The buoyancy engine according to claim 13, wherein the means that the spacers have for maintaining clearance are rollers.

15. The buoyancy engine according to claim 14, wherein the spacers having quick connect and disconnect means whereby the variable ballasted power piston can be removed from the upper casing for servicing.

16. A method of generating power using a buoyancy engine, comprising the steps of:
- (a) moving a slide valve to a first position that allows liquid to enter an upper casing and surround a variably ballasted power piston;
- (b) purging liquid from an interior of the variably ballasted power piston, making it buoyant;
- (c) movement of the variably ballasted power piston in a power stroke;
- (d) transfer of energy by the movement from the variably ballasted power piston to an output device and a liquid discharge piston;
- (e) moving the slide valve to a second position that allows liquid to drain from the upper casing into an interior of the liquid discharge piston;
- (f) purging liquid from the interior of the liquid discharge piston; and
- (g) returning to step (a).

17. The method of generating power using a buoyancy engine according to step 16, wherein liquid is purged from the interior of the liquid discharge piston when the variably ballasted power piston moves up.

18. The method of generating power using a buoyancy engine according to step 16, wherein liquid is purged from the interior of the liquid discharge piston when the variably ballasted power piston moves down.

19. The method of generating power using a buoyancy engine according to step 16, wherein if the liquid discharge piston fails, a backup system purges liquid.

20. The method of generating power using a buoyancy engine according to step 16, wherein if the slide valve fails, backup valves are used.

* * * * *